UNITED STATES PATENT OFFICE.

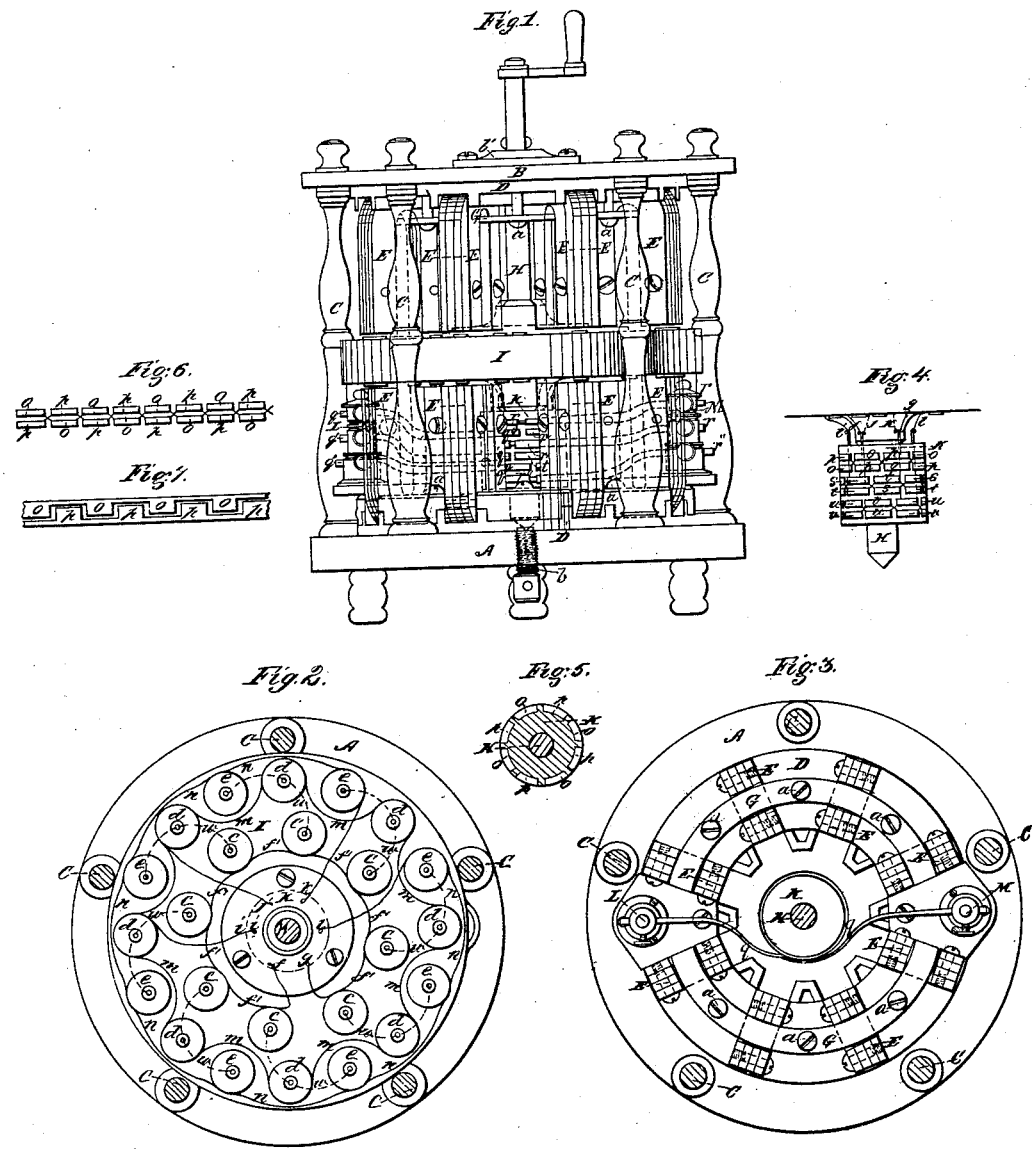

CALVIN CARPENTER, JR., OF PAWTUCKET, MASSACHUSETTS.

IMPROVEMENT IN MAGNETO-ELECTRIC MACHINES.

Specification forming part of Letters Patent No. 10,175, dated November 1, 1853.

*To all whom it may concern:*

Be it known that I, CALVIN CARPENTER, Jr., of Pawtucket, in the county of Bristol and State of Massachusetts, have invented certain new and useful Improvements in Magneto-Electric Machines; and I do hereby declare that the following is a full, clear, and exact description of the same, reference being had to the accompanying drawings, forming part of this specification, in which—

Figure 1 is an elevation of my spiral magneto-electric battery. Fig. 2 is a horizontal section of the same, taken immediately above the rotating wheel. Fig. 3 is another horizontal section of the same, taken immediately below the rotating wheel. Fig. 4 is an elevation of what I term the "current-discharger." Fig. 5 is a section of the same in a plane perpendicular to its axis. Fig. 6 shows, in projection, the arrangement of the magnetic segments in the current-discharger; and Fig. 7 shows, in projection, a modification of the same.

Similar letters of reference indicate corresponding parts in each of the several figures.

The object of this invention is to develop a perfectly continuous electric current through the agency of permanent magnets.

None of the previously-constructed magneto-electric machines known to me will develop a continuous current, but merely a broken current, which, by very rapid rotation of the helices, so as to make the breaks follow each other in quick succession, is made apparently continuous. The change of direction of the current takes place precisely when the center of the helices of a circuit come directly opposite the center of the poles of the magnets, between which they revolve.

My invention therefore consists in the arrangement and combination, as herein described, of permanent magnets and disks of helices for producing an uninterrupted electric current.

A in the accompanying drawings is the base of the machine, which consists of a cast-iron plate of circular form and of sufficient strength to carry all the parts.

B is a plate of similar form and diameter to A, and supported at a convenient distance above by standards C C, which are placed as near as possible to the peripheries. To the upper side of the plate A is secured another plate, D, which has suitable recesses to receive a number of steel magnets, E E, of the well-known U form, which I term a "plane of magnets." Of these magnets eight (8) are shown arranged in a circle, being placed vertically with their poles upward, the faces of all their poles being in a horizontal plane, and their centers being in equidistant lines radiating from a common axis. (See Fig. 3.) Their poles are so arranged that there will be a north pole and south pole alternately all around the circle, thus bringing two north poles opposite each other on opposite sides of the center of the circle and two south poles opposite.

The magnets are secured to the plate D by a ring, G, of metal, which is placed between the poles at the bends, and sunk into and bolted to the plate by screw-bolts *a a*.

The above-described arrangement of magnetic poles forms electric spheres between all the poles throughout the circle, which will induce an electric current in a conductor passed around the circle, changing the direction and breaking the circuit of such electric current at the center of each magnetic pole which it passes in the circle. The effect thus obtained is an interrupted electric current. In order to render the electric current thus obtained stronger, another plane of magnets corresponding in number and arrangement to that above described attached to a similar plate, D, and having its corresponding parts indicated by similar letters in the drawings, is secured to the under side of the plate B, the poles of the magnets of this series being brought vertically opposite those of the lower series; but the north poles of one series being all brought opposite the south poles of the other series, thus making a series of magnetic or electric spheres in each of the series of circles of magnets, the spheres of one plane of magnets coalescing with the spheres of the other plane and making each electric or magnetic sphere doubly as strong as it would be in one plane alone. The distance between the poles of the magnets of the two planes should be about one-third greater than the distance across the end of the pole, to obtain the maximum power. In this part of the machine all the forces are concentrated ready for directive action whenever the requisite or properly-constructed machinery is placed before it. The machinery employed to receive these magnetic forces will be next explained.

H is a vertical shaft whose axis passes through the centers of the two circles of magnets. This shaft is supported upon an adjustable step-bearing, $b$, attached to the base-plate A, and works in a guide, $b'$, in the upper plate, B. It carries a wooden wheel or disk, I, which is secured to it in such a position as to revolve between the poles of the two planes of magnets without quite touching them. The diameter of this wheel must not be less than that of a circle circumscribing the magnets, and its thickness as well as the distance of the poles of the two planes of magnets will be governed by the length of the helices which the wheel is to receive. From the axis of the wheel circles must be described on either face corresponding to circles described through the centers of the poles of the magnets. This will make two circles for every circle of magnets. In the inner of these circles a number of circular holes corresponding with the number of magnets in the circle are bored through the wheel at equal distances apart to receive as many helices. These helices are fitted tightly in the holes which form boxes for them. In the outer circle twice the number of holes are bored to receive similar helices. The helices in the outer circle are at equal distances apart, and are so arranged in relation to those of the series in the inner circle that the centers of no two helices of which one is in the outer and the other in the inner circle can be at the same time opposite the centers of the poles of the magnets.

The helices consist of coils of copper wire insulated with a core of iron wires in the middle of each, being similar to other magneto-electric helices.

It will be understood that by the above arrangement of the helices of the two circles, while the helices in the inner circle are opposite the centers of the magnetic poles, where the electric current is changed and broken the helices in the outer circle are a little on either side of the poles where the strongest part of the charge is given off. Hence, the strong points of the induced current are brought to bear against the broken or interrupted points, keeping an electric current always flowing without break.

The helices in both circles are caused to discharge their forces into one current by means of a current-discharger, which gathers the currents induced in the two series at the proper times, and thus develops one unbroken electric current of uniform quantity and intensity.

The arrangement of the helices is shown in Fig. 2, where those in the inner circle, eight in number, constituting one series, are all indicated by $c$; but as those in the outer circle constitute two distinct series of eight they are indicated by $d$ and $e$ alternately all the way round, those indicated by $d$ constituting one series and those by $e$ the other series, the helices included in the inner circle being all included in one series and all connected together to form one circuit. The series $d$ in the outer circle are all connected together to form another circuit. The series $e$ are all connected together to form a third circuit.

Care must be taken to connect the helices with each other in a proper manner, in order that the electric currents developed in them shall not run in opposite directions and thus counteract and neutralize each other's forces, and it is better that all the helices which are connected together to form one circuit should be coiled in one direction.

An intense or quantity current can be obtained from helices of the same length and size of wire by different modes of connecting the wires of the several helices of each series.

For intensity of current the mode of connection shown in the drawings is necessary. The outside end of the coil of each helix should be soldered to the outside end of the coil of the next helix and the inside end of each to the inside end of the next, and so on in regular succession through the series, so as to leave but two ends to the wire, forming two poles, of which the positive and negative state of each will change places alternately as they pass the centers of the different poles of the magnets which form the magnetic circle.

$f''f'$ represent the connections between the helices $c\ c$, and $f$ and $g$ are the terminations of the wire. $m\ m$ represent the connections between the helices $d\ d$, and $i$ and $j$ are the terminations of the wire. $n\ n$ represent the connections between the helices $e\ e$, and $k$ and $l$ are the terminations of the wire.

If a quantity-current is desired, the inner ends of one half of the helices of each series and the outer ends of the other half should be connected together to form one pole, and the outer ends of the first half and the inner ends of the last half to form the other pole.

The first-named arrangement requires the current to pass through the whole length of the wire of which the series of helices is composed, and the last arrangement only requires it to pass through the length of each helix.

The duty of the current-discharger is to turn the direction of the ever-changing current developed in the helices and connect all the poles to form one circuit. It consists of a cylinder, K, of ivory or other non-conducting material, firmly secured to the shaft H. Into the periphery of this cylinder a number of segments, of copper or other good conducting metal, are inserted so as to stand even with its surface.

The current-discharger, considered as a whole in relation to the whole number of series of helices, may be said to be composed of three independent minor current-dischargers, or one for each series of helices. Each minor current-discharger is composed of two parallel rows of segments extending directly round the cylinder K, the number in each row being equal to the number of magnets in a plane, eight being the number in the machine shown. The segments are of such length as to leave only a small break of non-conducting surface between every two consecutively, and of each row one-half the number have no connection with the other half, but are connected with half of the other row in the following order, videlicet: Each segment is connected by wires within the cylinder with those segments on the opposite row which are next to the segment opposite it, thus forming two metallic bands extending entirely round the cylinder, each band being formed by a segment of one row and one of the other row alternately, and being insulated from the other band. This will be understood by reference to Fig. 6, where the segments $o\ o$ are connected and the segments $p\ p$ are connected, the wires connecting the former being represented by red dotted lines and those connecting $p\ p$ by red perfect lines.

The upper minor current-discharger, consisting of the segments $o\ o$ and $p\ p$, directs and discharges the currents from the helices $c\ c$, and by explaining it singly the respective operations of the others will be made intelligible.

The ends $f\ g$ of the wires, or positive and negative poles of the series $c\ c$ of helices, are connected, the former to one of the segments $o\ o$ and the latter to the segments $p\ p$. Thus the two series of segments become positive and negative poles, the ivory serving to insulate them from each other. The major or terminal poles of the machine, in which all the currents are formed by two brass posts, L M, are secured to the base in such a way as to be insulated, and hold stationary springs $q\ r$, whose points bear upon the two rows of segments and receive the electric current whenever discharged from the segments. The points of the springs must bear such relation to the segments that they will bear directly on the centers of the breaks or divisions between the segments of each row precisely when the centers of the helices $c\ c$ come opposite the centers of the poles of the magnets E E, and that one will always bear on a segment, $o$, while the other bears on a segment, $p$.

When the wheel of helices has rotary motion an electric current will be discharged into the springs whenever the springs bear upon the metallic segments, and the current will be broken whenever they bear upon the breaks or spaces between the segments and the change in its direction takes place. The current must always flow in the same direction through the springs, for the instant the change in the direction of the current takes place the poles of the segments are changed. The only way in which the direction of the current can be changed in the springs and posts is by changing the direction of the revolution of the helices. The current developed by each minor current-discharger is only a broken current, though its direction does not change, and it is by the peculiar arrangement of the several minor current-dischargers in the principal or whole current-discharger which makes the current continuous.

$s\ s$ and $t\ t$ are the segments which form the current-discharger for the helices $d\ d$, the end $i$ of the wire of the helices being connected with $s\ s$, and the end $j$ being connected with $t\ t$. $q'\ r'$ are the springs which receive the electric currents from $s\ s$ and $t\ t$ and conduct them to the posts L M. $u\ u$ and $v\ v$ are the segments which form the current-discharger for the helices $e\ e$, the end $k$ of the wire of the helices being connected with $u\ u$, and the end $l$ with $v\ v$. $q''\ r''$ are the springs which receive the electric current from $u\ u$ and $v\ v$. Each of these minor current-dischargers considered separately bears and operates in the same relation to its respective series of helices as the one first described; therefore all that now remains to be described is the arrangement of the several minor current-dischargers to form the principal discharger and unite all their broken currents in one unbroken current.

It may be seen by reference to Fig. 2 that the helices of the three series are spirally arranged in relation to each other. This is indicated by eight spiral dotted lines, $w$, each of which passes through one helix of every series. The helices pass the poles of the magnets in the order indicated by these lines, one of each series in regular succession. The minor current-dischargers are arranged upon the cylinder K to form the principal current-discharger in such a manner that the breaks do not come in lines parallel with the axis. The bearing-points of the springs are all in such a line, and therefore not more than one of the circuits between the segments and springs can be broken at the same time.

It may be seen by reference to Fig. 4 that the breaks are arranged spirally on the cylinder, and are caused to pass the points of the springs in the same order of succession as the helices with which they are, respectively, connected pass the poles of the magnets; hence the breaks must follow in regular succession and at the proper intervals, two currents being always flowing between the segments and springs to the posts L and M, which unite them and form one positive and one negative pole. The same result may be obtained if the breaks are in line and the points of the springs are arranged spirally.

This machine does not require to be rotated at a high velocity, but only at such a velocity as to induce a current.

I have described my machine in its simplest form, but the principle on which it is constructed may be extended.

To make a more powerful machine several circles of magnets may be used in the same plane, two circles of helices being employed for every circle of magnets, and the said helices being divided into series, each containing a number of helices equal to the number of magnets in their respective circles, all connected together as described and furnished with a minor current-discharger. Several wheels of helices may be employed on the same shaft, each wheel being interposed between two planes of magnets, and being similarly furnished with current-dischargers to the single wheel and two planes of magnets. The shaft may be placed in a horizontal position, and the wheels and planes of magnets vertical, and I consider that where more than one wheel of helices and two planes of magnets are employed this arrangement is best; but where only one wheel of helices and two planes of magnets are used, the planes of magnets and wheels should be horizontal and the shaft vertical, as shown.

The smallest number of magnets which can be used to advantage in a circle is four, and the number employed in one circle should be one, which is divisible by four without a remainder, as such a number will always bring two north poles opposite each other and two south poles opposite each other.

In addition to the mode already described of connecting the segments of the current-dischargers that shown in Fig. 7 may be employed, and is equivalent to that before described. The segments $o\,o$ and $p\,p$ are there shown connected by continuous metallic bands extending round the cylinder K, the segments in regular succession round the cylinder K being alternately connected to one and the other band. In this case, the points of the springs will require to be so arranged that they will bear upon any such two spaces between the segments that will cause each, as the segments rotate, to be brought in contact with a segment of a different series.

Having thus described my invention, I will proceed to define what I claim and desire to secure by Letters Patent.

I do not claim the employment of permanent magnets of helical coils of wire, of metallic segments upon a cylinder of non-conducting material, or of springs, such as I have described, either separately or in combination, for the purposes set forth, otherwise than in the manner in which I have arranged, connected, and combined them; but

What I claim is—

The combination of one or more series of permanent magnets radially arranged, the poles of each series being in one plane and in two concentric circles, with a disk or disks of helices arranged in three sets in such manner that the three sets may be acted upon successively at nearly equal intervals of time, one set by the inner circle of poles and the other two sets by the outer circle of poles, the currents of the several sets of helices being thrown into one constant or uninterrupted current by means of the current-dischargers and springs or their equivalents, as herein described.

CALVIN CARPENTER, JR.

Witnesses:
WM. W. BLODGETT,
T. K. KING.